(12) United States Patent
Fan (10) Patent No.: US 10,641,314 B1
(45) Date of Patent: May 5, 2020

(54) SUCTION HOLDER (71) Applicant: Eagle Fan, Chu-Pei (TW)

(72) Inventor: Eagle Fan, Chu-Pei (TW)

( * ) Notice: Subject to any disclaimer, the term of this patent is extended or adjusted under 35 U.S.C. 154(b) by 0 days.

(21) Appl. No.: 16/355,027

(22) Filed: Mar. 15, 2019

(51) Int. Cl.
*F16B 47/00* (2006.01)
*B60R 11/00* (2006.01)

(52) U.S. Cl.
CPC ..... *F16B 47/006* (2013.01); *B60R 2011/0056* (2013.01)

(58) Field of Classification Search
CPC .............. F16B 47/00; F16B 47/006; B60R 2011/0056; B60R 2011/0068; B25B 11/007
USPC ............................................. 248/205.5–206.4
See application file for complete search history.

(56) References Cited

U.S. PATENT DOCUMENTS

| | | | | |
|---|---|---|---|---|
| 2,657,893 | A * | 11/1953 | Puckert | F16B 47/00 248/205.8 |
| 6,478,271 | B1 * | 11/2002 | Mulholland | F16B 47/00 248/205.8 |
| 7,628,362 | B2 * | 12/2009 | Song | F16B 47/003 248/205.5 |
| 7,753,324 | B2 * | 7/2010 | Chien | A47K 17/022 248/205.8 |
| 8,191,839 | B2 * | 6/2012 | Fan | F16B 47/006 248/205.5 |
| 8,356,781 | B2 * | 1/2013 | Chen | F16B 47/006 248/206.2 |
| 8,496,222 | B2 * | 7/2013 | Li | F16B 47/006 248/205.5 |
| 9,145,913 | B2 * | 9/2015 | Song | A42B 3/006 |
| 9,410,571 | B2 * | 8/2016 | Yang | F16B 47/00 |
| 9,486,111 | B2 * | 11/2016 | Flannery | A47K 17/022 |
| 9,624,963 | B2 * | 4/2017 | Shi | A47K 10/14 |
| 2015/0076299 | A1 * | 3/2015 | Yu | F16M 13/022 248/205.8 |

FOREIGN PATENT DOCUMENTS

EP    1082934 A2 *  3/2001  ............... A47K 5/04

\* cited by examiner

*Primary Examiner* — Jonathan Liu
*Assistant Examiner* — Guang H Guan
(74) *Attorney, Agent, or Firm* — Rabin & Berdo, P.C.

(57) ABSTRACT

A suction holder includes a suction unit, a housing unit, a pressure deformable unit, and a linkage positioning unit. The suction unit includes a suction cup and a traction element engaged to a top of the suction cup. The pressure deformable unit has a circumference radially distributed with a plurality of elastic pressing elements. The pressure deformable unit is located on the suction cup and is confined in the housing unit. The linkage positioning unit can drive the traction element to move upward so that the suction cup can attach to a surface. When the surface is curved or has arcs, the elastic pressing elements can be deformed to different extents to be pressed on the suction cup to maintain better attachment to the surface.

6 Claims, 7 Drawing Sheets

SUCTION HOLDER

TECHNICAL FIELD

The technical field generally relates to a suction device, in particularly, to a suction holder able to attach to a curved surface or a surface with arcs for holding a portable device.

BACKGROUND

The suction-based fixture used as a device holder is ubiquitous nowadays. The suction cup usually includes a plurality of components and achieves suction through a two-tier suction mechanism. For example, a mechanical structure such as a cam action lever is used to pull the central portion of the suction cup away from the surface to be attached to for increasing the negative pressure between the suction cup and the surface to maintain the adsorption effect.

Because holding a mobile phone while driving is dangerous, some drivers use the device holder with suction cup to mount the top platform on the dashboard in the vehicle. However, as the optimal suction of the suction cup is on a flat, i.e., planar, smooth surface, while the top platform is always composed of a curved surface to achieve visual esthetics as well as certain design concerns, the curved surface may prevent the suction cup from completely sealing the surface area that the suction cup is attached to, the suction force is weakened and may cause the suction cup to fall off easily.

SUMMARY

The primary object of the present invention is to provide a suction holder able to attach to a curvy surface.

To achieve the above object, the present invention provides a suction holder, including a suction unit, a housing unit, a pressure deformable unit, and a linkage positioning unit. The suction unit includes a suction cup and a traction element. The traction element is engaged to central portion of the top of the suction cup. The housing unit is a shell with an upwardly raised central portion and the shell is disposed with a passage hole for the traction element to pass through from bottom to top. The pressure deformable unit is a conical shell and has a circumference radially distributed with a plurality of elastic pressing elements. The top of the pressure deformable unit is in contact with inner wall of the housing unit, and the plurality of the elastic pressing elements press on the suction cup, so that the pressure deformable unit is located on the suction cup and is confined in the housing unit. The linkage positioning unit is located on the housing unit and is coupled to the traction element of the suction unit. The linkage positioning unit can drive the traction element to move upward and lock or release the traction element from raised position.

In an embodiment of the present invention, the top of the pressure deformable unit is fixed to the inner wall of the housing unit.

In an embodiment of the present invention, the top of the pressure deformable unit is only in contact with the inner wall of the housing unit but is not fixed.

In an embodiment of the present invention, the top of the pressure deformable unit has a mounting hole for the traction element to extend from the bottom to the top.

In an embodiment of the present invention, the elastic pressing element has a curved end segment, and the curved end segment has a curved surface pressed against the top surface of the suction cup.

In the embodiment of the present invention, the suction unit further comprises a protruding ring that protrudes upward and is formed on a circumferential edge of the suction cup.

In an embodiment of the present invention, the suction holder further comprises a spring, located between the pressure deformable unit and the suction cup, and surrounds periphery of the traction element.

In summary, the present invention is characterized in that when the suction cup is attached to a curved surface, the housing unit is first pressed against the pressure deformable unit, so that the plurality of elastic pressing elements are deformed to different extents and are pressed against on the suction cup, to ensure that the bottom surface of the suction cup is completely attached to the curved surface. When the linkage positioning unit drives the traction element to move the central portion of the suction cup away from the curved surface, a good vacuum suction can be maintained, thereby increasing the suction holder for attaching to different surfaces.

The foregoing will become better understood from a careful reading of a detailed description provided herein below with appropriate reference to the accompanying drawings.

BRIEF DESCRIPTION OF THE DRAWINGS

The embodiments can be understood in more detail by reading the subsequent detailed description in conjunction with the examples and references made to the accompanying drawings, wherein.

DETAILED DESCRIPTION OF THE DISCLOSED EMBODIMENTS

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
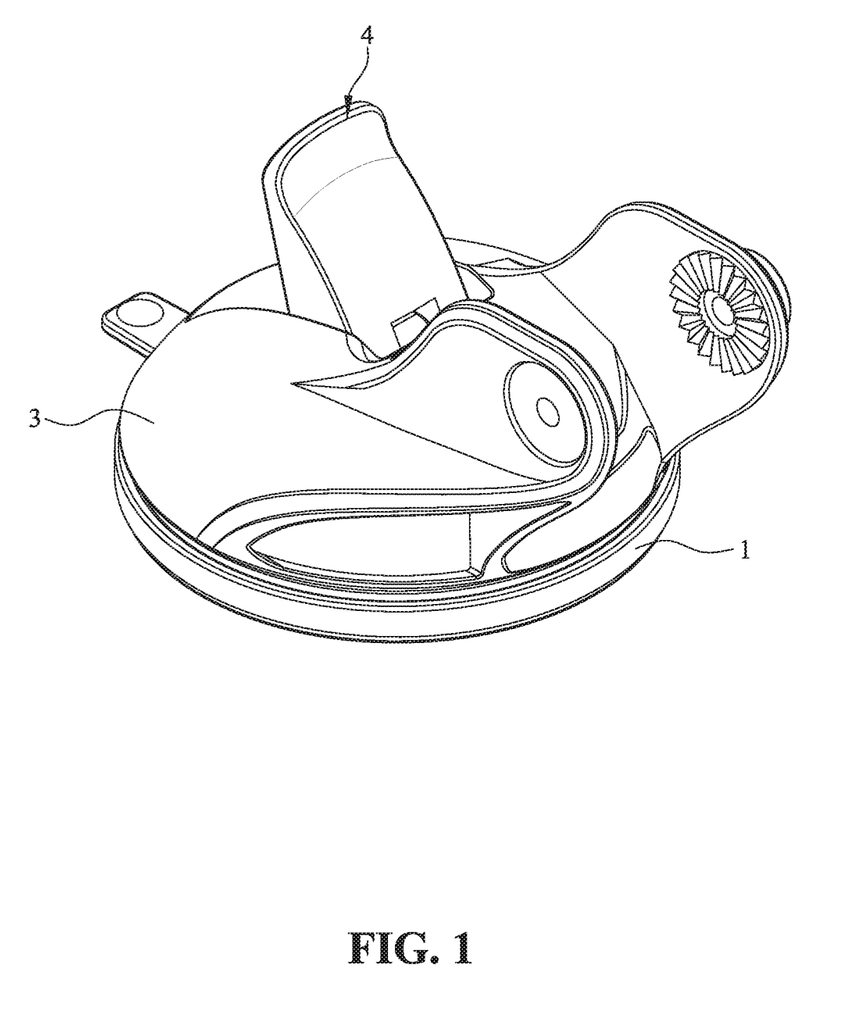
FIG. 1 shows a schematic view of the first embodiment of the present invention.
Figure 2:
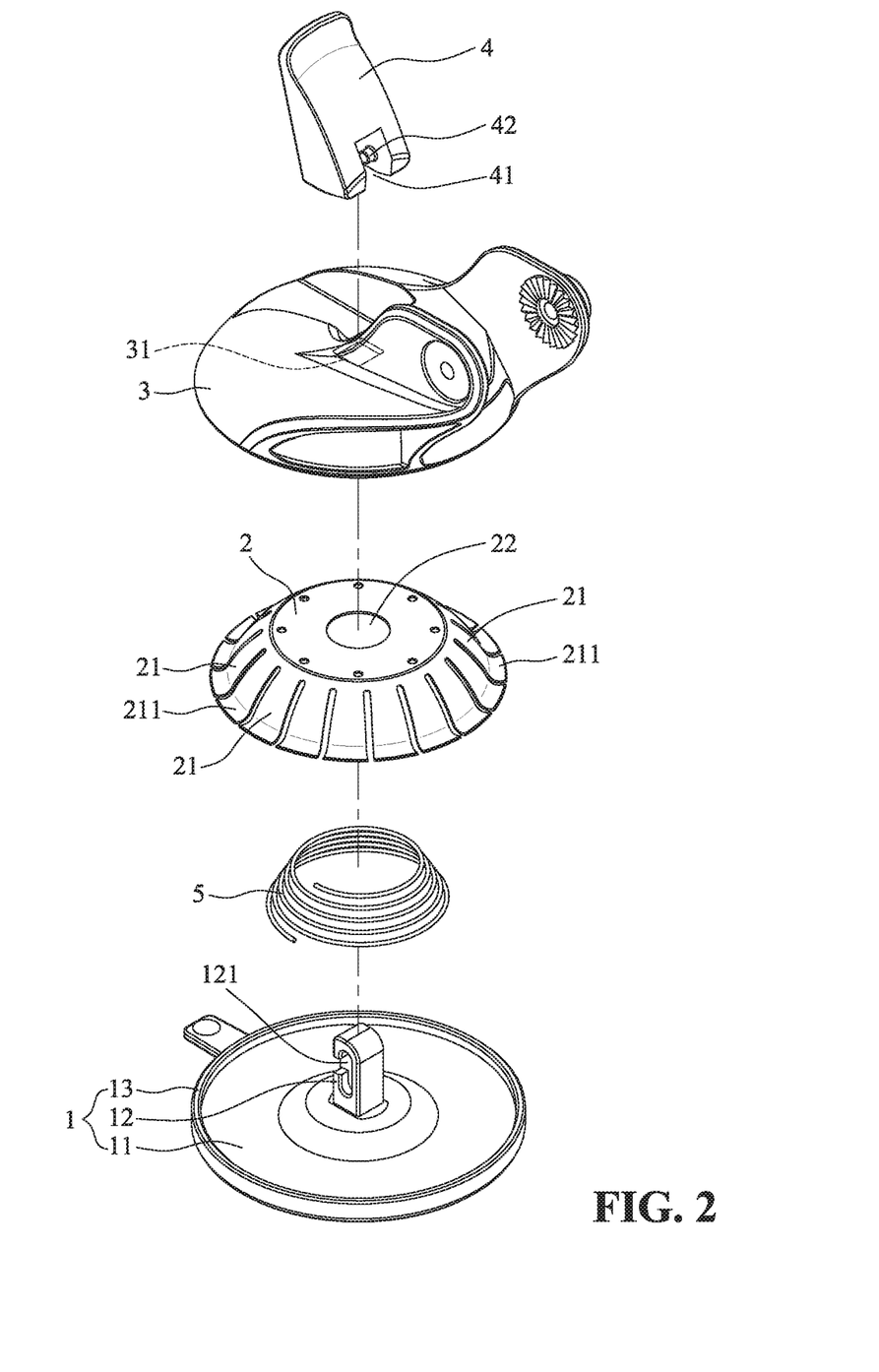
FIG. 2 shows a dissected view of the first embodiment of the present invention.

FIG. 1 and FIG. 2 show a schematic view and a dissected view of the present invention respectively. A suction holder 100 of the present invention comprises a suction unit 1, a pressure deformable unit 2, a housing unit 3, and a linkage positioning unit 4.

The suction unit 1 comprises a suction cup 11 and a traction element 12. The suction cup 11 is a round pad with a flat bottom and is made of soft rubber material. The bottom of the suction cup 11 may also be made of adhesive rubber or silicon material. The traction element 12 has a pillar shape, with a bottom engaged to the central portion of the top of the suction cup 11.

The pressure deformable unit 2 is a conical shell and has a circumference radially distributed with a plurality of elastic pressing elements 21. The elastic pressing element 21 curves upwards. The center of the pressure deformable unit 2 has a mounting hole 22 for the traction element 12 to extend from the bottom to the top. When assembled, the top of the pressure deformable unit 2 is in contact with inner wall of the housing unit 3, and the plurality of the elastic pressing elements 21 press on the suction cup 11, so that the pressure deformable unit 2 is located on the suction cup 11 and is confined in the housing unit 3. The elastic pressing element 21 has a curved end segment 211, and the curved end segment 211 has a curved surface contacting and pressed against the top surface of the suction cup 11. The pressure deformable unit 2 is formed by pressing a metal foil. When the external force is applied thereto, the plurality of elastic pressing elements 21 can be individually deformed outwardly, and when the external force disappears, the original state can be restored. In the present invention, the plurality of the elastic pressing elements 21 are used to press against near the edge of the top surface of the suction cup 11 in a ring shape, so that the suction cup 11 can be completely conformed to the surface to be attached to regardless of whether the surface is a curved surface or a surface with arcs.

The housing unit 3 is a shell with an upwardly raised central portion. When assembled, the shell is located above the suction cup 12 of the suction unit 1. The housing unit 3 is disposed with a passage hole 31 at the central portion for the traction element 11 of the suction unit 1 to pass through and extend beyond the housing unit 3. The shape of the housing unit 3 is not limited to the view shown in the figures, and can be designed to match the connection structure to be used in combination.

Figure 3:
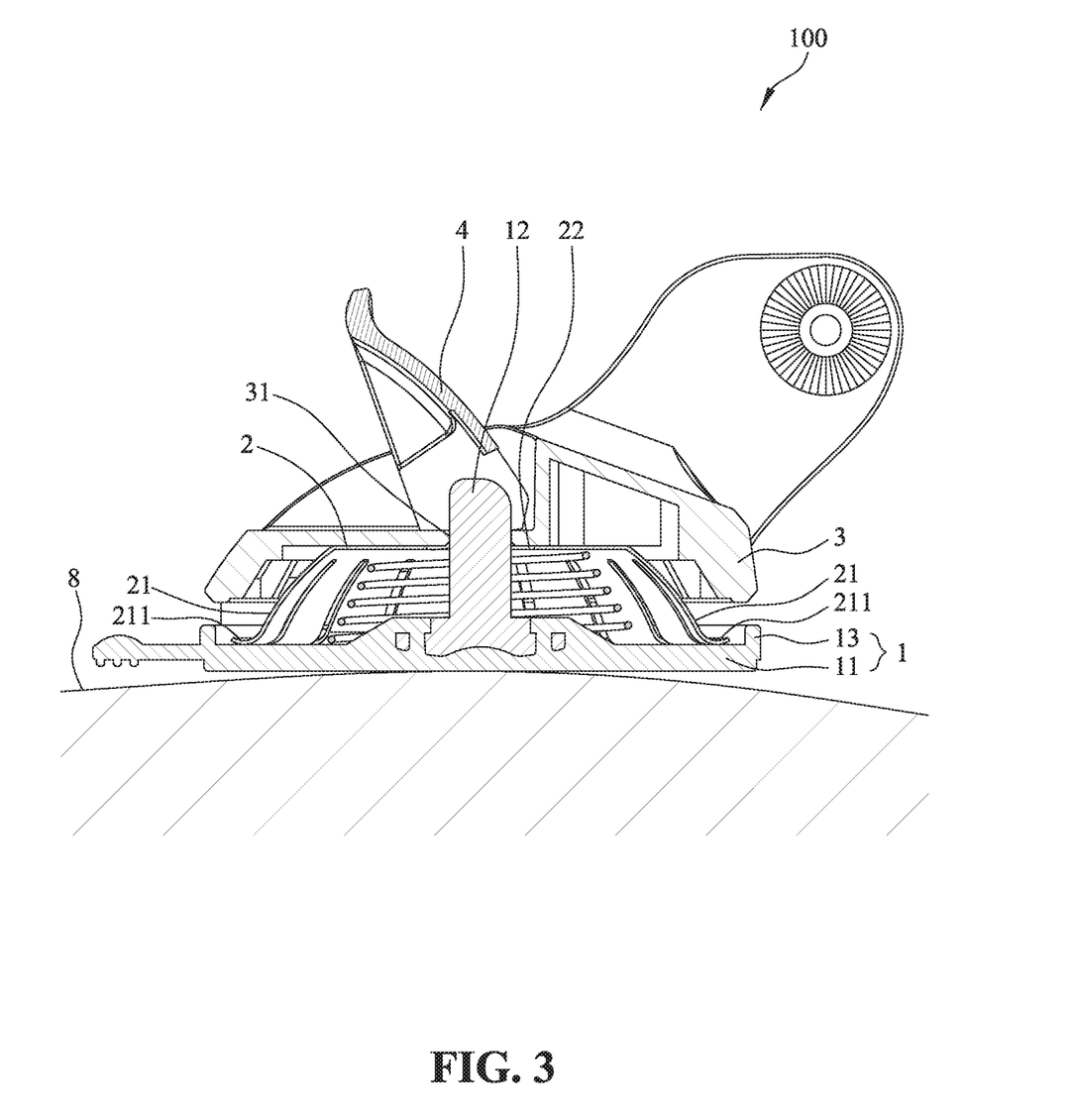
FIG. 3 shows a cross-sectional view of the present invention before applying pressure.

In the present embodiment, the top of the pressure deformable unit 2 is planar. As shown in FIG. 3, the top of the pressure deformable unit 2 is in contact with the inner wall of the housing unit 3 but is not fixed. However, the present invention is not limited thereto, the pressure deformable unit 2 and the housing unit 3 can be fixed by screws or adhesives. When the housing unit 3 is pressed down, the plurality of elastic pressing elements 21 can expand outwards smoothly.

The linkage positioning unit 4 is responsible for pulling the traction element 12 upwards and for locking or releasing the traction element 11 from the raised position, which in turn, pulls the central portion of the suction cup 11 upwards to achieve attachment. As the linkage positioning unit 4 can be realized in various embodiments, the present invention does not impose specific limitation the structure of the linkage positioning unit 4.

In the present embodiment, the linkage positioning unit 4 is a pull lever, coupled to the top of the traction element 12. The user can flip or pull the linkage position unit 4 to contact the top wall of the housing unit 3 at different locations to guide the lifting/lowering and positioning of the traction element 12. The way the linkage positioning unit 4 is pivotally connected to the traction member 12 is as follows: the linkage positioning unit 4 is disposed with a notch 41. The inside of the notch 41 is disposed with a set of two short axes 42 corresponding to each other. The traction element 12 is disposed with two guiding slots 121 that are located on opposite vertical sidewall surfaces. When assembled, the housing unit 3, the pressure deformable unit 2, and the suction cup 11 are sequentially assembled from top to bottom. The top of the traction element 12 extends out of the housing unit 3 through the passage hole 31. The linkage positioning unit 4 provides the notch 41 for the traction element 12 to pivot the short axes 42 into the guiding slots 121. The entire assembly is then completed. When the linkage positioning unit 4 is pulled downward, the traction element 12 is pulled to raise the central portion of the suction cup 11.

Moreover, the suction unit 1 further comprises a protruding ring 13. The protruding ring 13 protrudes upward and is formed on the circumferential edge of the suction cup 11. The protruding ring 13 is formed with the suction cup monolithically. The protruding ring 13 is to prevent the elastic pressing elements 21 from sliding outside of the suction cup 11 when the pressure deformable unit 2 is pressed down.

Moreover, the suction holder further comprises a spring 5. The spring 5 is a conical coil spring. In assembly, the spring 5 surrounds the periphery of the traction element 12 and is between the pressure deformable unit 2 and the suction cup 11. The spring 5 is to provide a downward pressure on the central portion of the suction cup 11. At the beginning when the suction cup 11 is placed on the surface to be attached to, the central portion of the suction cup 11 is pressed by the spring 5, and the edge of the top surface is pressed by the plurality of elastic pressing elements 21, so that the suction cup 11 can be completely attached to the surface.

The following describes the actual operation of the present invention. FIG. 3 shows a cross-sectional view of the present invention before applying pressure. The objective of the present invention is to provide a suction holder able to attach to a curved surface. As shown in FIG. 3, when the suction holder 100 is to attach to a curved surface 8. The left side of the curved surface 8 is higher than the right side. In the case where no external force is applied, there is a gap between the edge of the bottom surface of the housing unit 3 and the suction cup 11. The suction cup 11 cannot completely attach to the curved surface 8.

Figure 4:
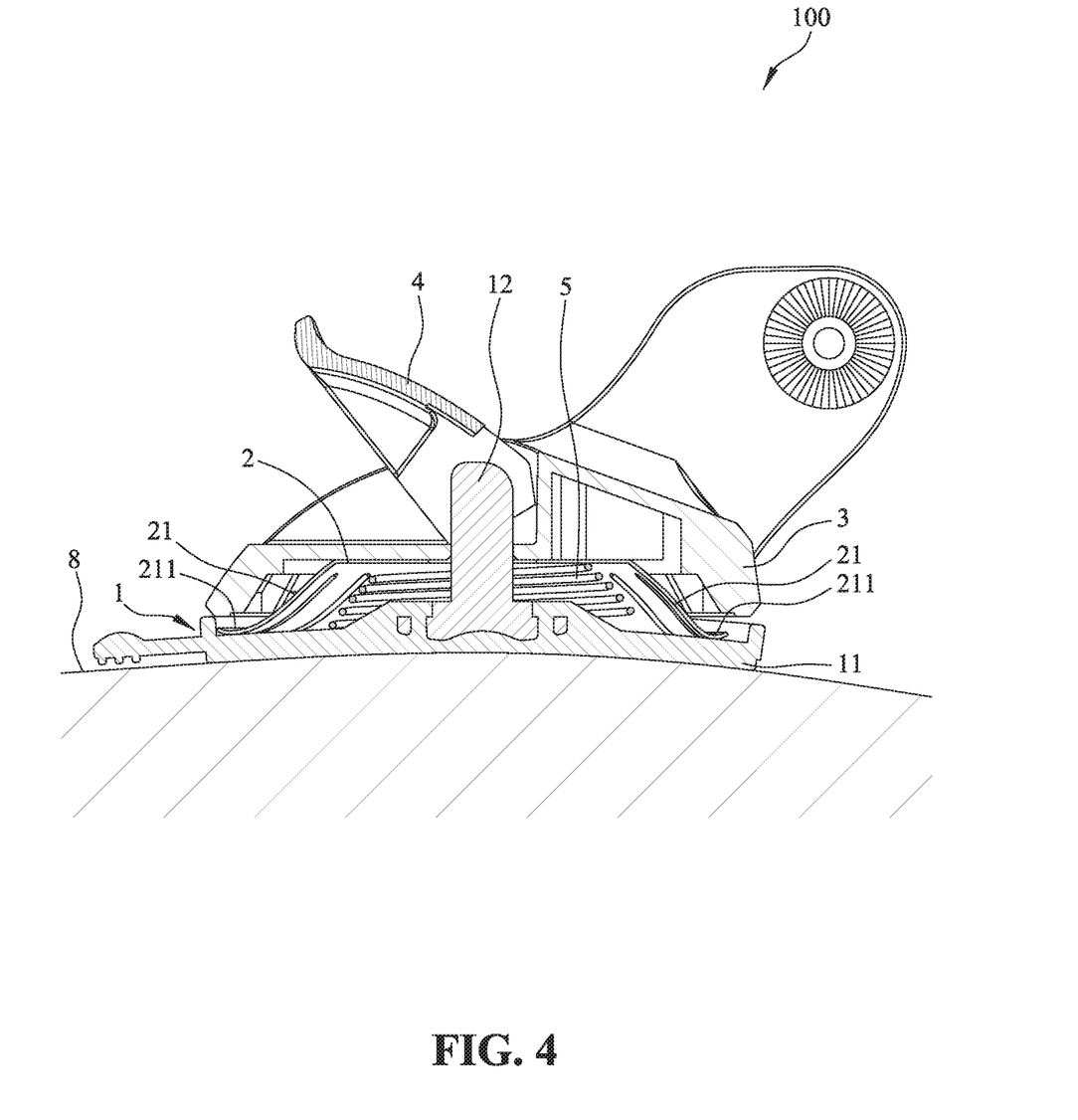
FIG. 4 shows a cross-sectional view of the present invention after applying pressure.

As shown in FIG. 4, the user presses the housing unit 3 downward and pulls the linkage positioning unit 4. Due to the curved surface 8, the elastic pressing elements 21 at different locations deform to different extents, which further enables all of the elastic pressing elements 21 distributed in a ring shape to be pressed against the suction cup 11 to ensure that the periphery of the suction cup 11 completely conforms to the curved surface 8.

Figure 5:
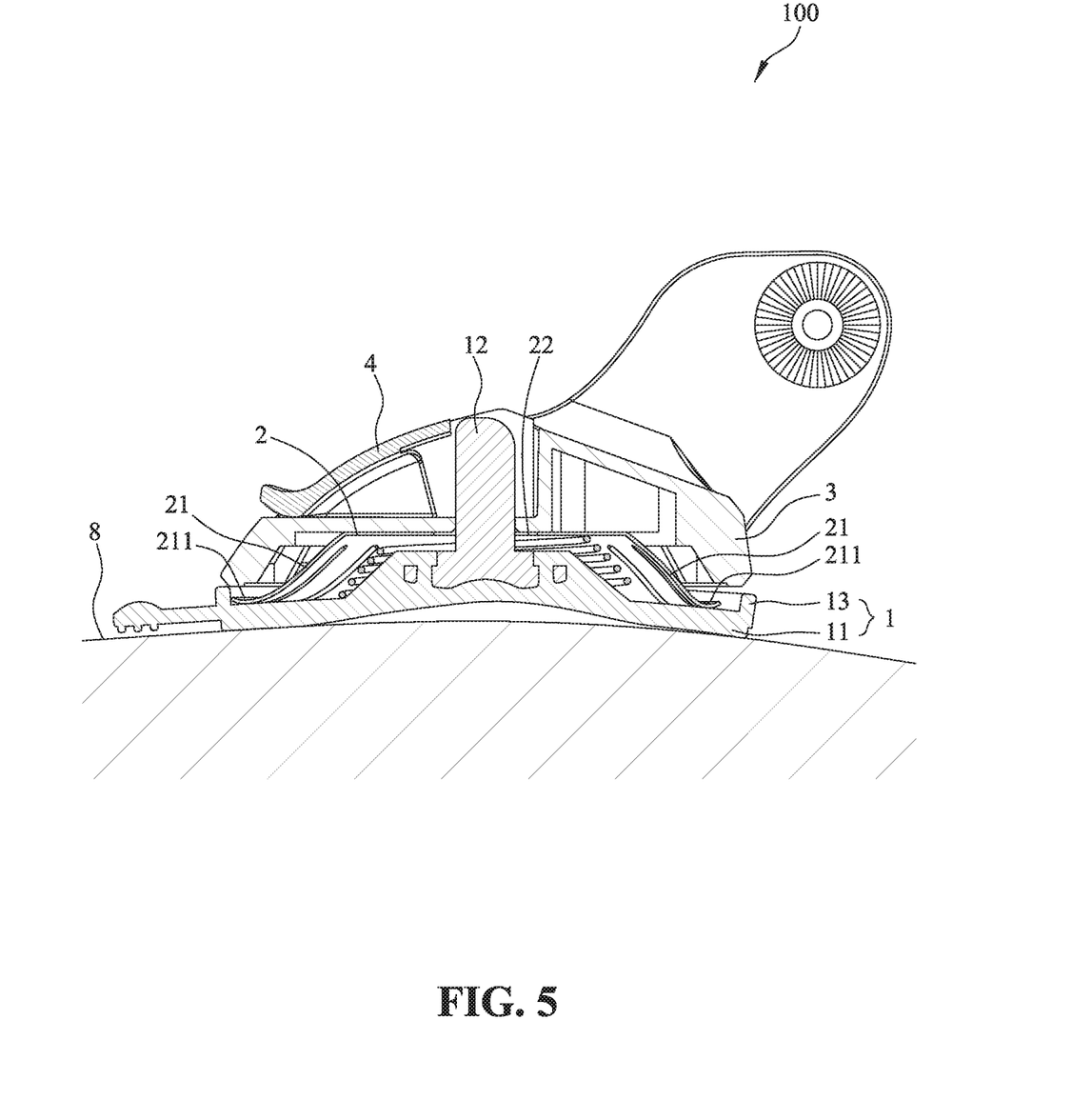
FIG. 5 shows a cross-sectional view of the present invention attached to a curved surface.

As shown in FIG. 5, the linkage positioning unit 4 is completely pulled downward, and the traction element 12 is pulled up to the highest point. The central portion of the suction cup 11 is separated from the curved surface 8 to generate a negative pressure, whereby the suction holder 100 of the present invention can maintain a good suction force.

Figure 6:
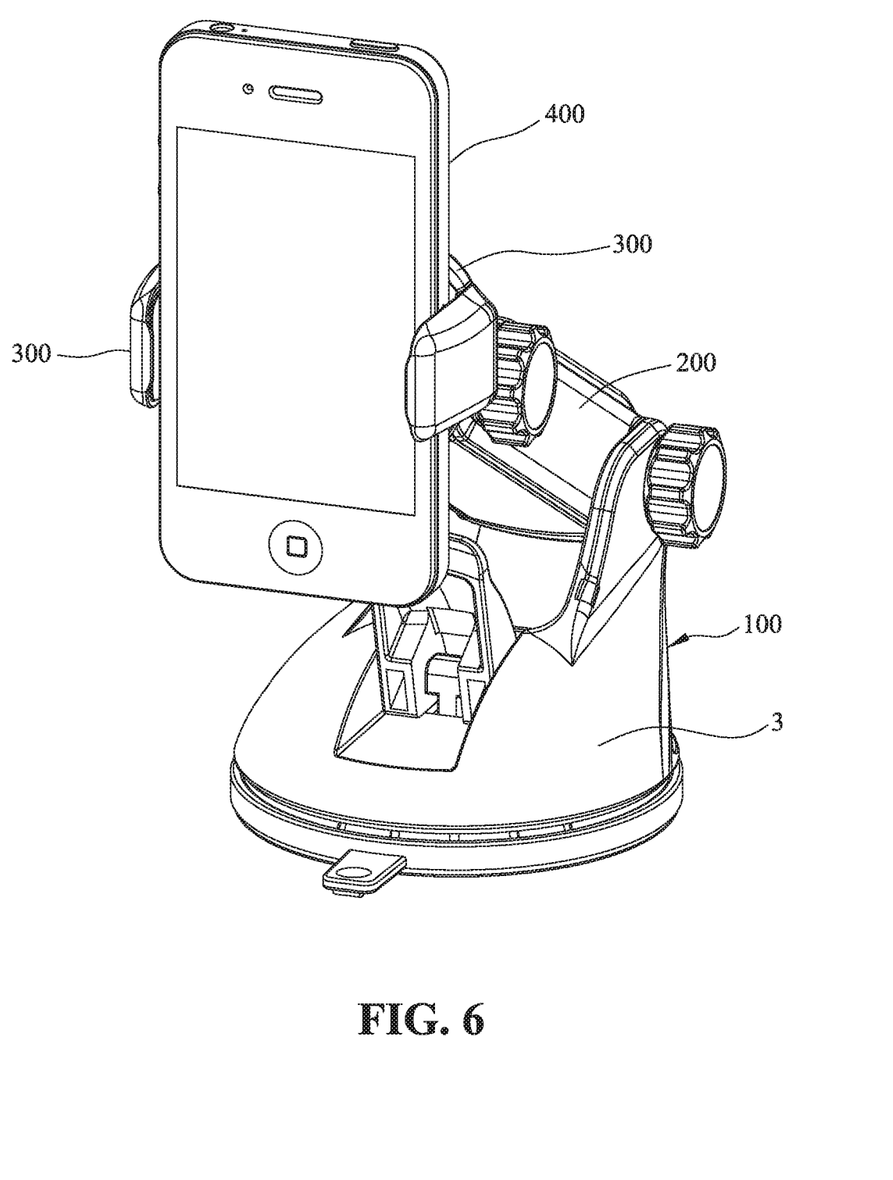
FIG. 6 shows a schematic view of the actual usage of the present invention in combination with other structures.

FIG. 6 shows a schematic view of the actual usage of the present invention in combination with other structures.

The suction holder 100 is used in combination with other connection structures to facilitate the electronic product to be placed and held on a smooth surface, a curved surface or a surface with arcs. The following illustrates only one of the embodiments and is not intended to limit the scope of the present invention. The present invention is to mount an extension support 200 on the top of the housing unit 3. The extension support 200 is additionally mounted with a clamping device 300. The clamping device 300 can hold a mobile phone 400. The user can attach the suction holder 100 to the curved platform above the dashboard of the vehicle, so that the mobile phone 400 can be used in the vehicle in a hands-free manner. Obviously, the extension support 200 and the clamping device 300 are not limited to those shown in the embodiment, and can be freely selected from various available products.

Figure 7:
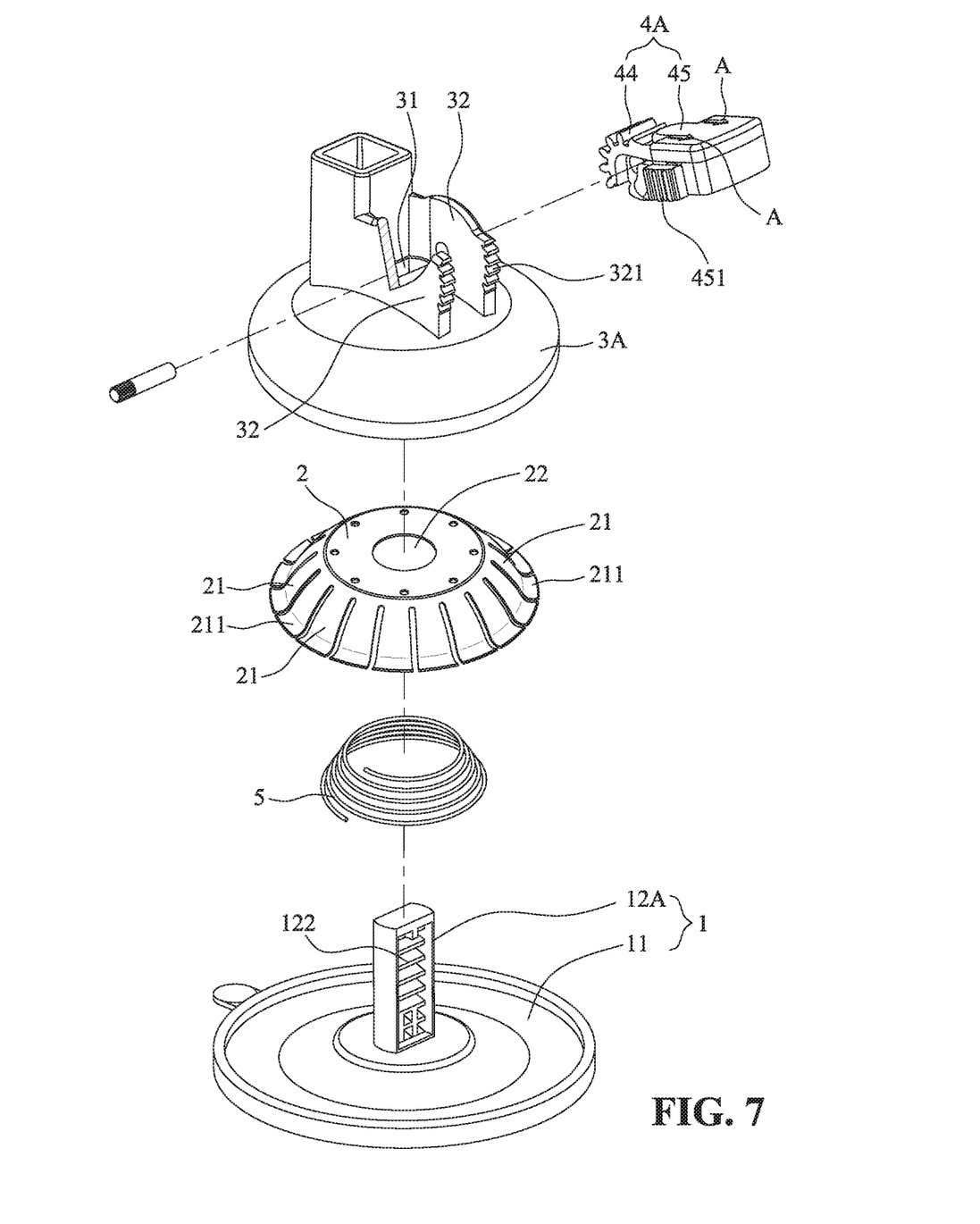
FIG. 7 shows a dissected view of the second embodiment of the present invention.

The following describes the second embodiment of the present invention. As shown in FIG. 7, the present embodiment mainly uses another linkage positioning unit 4A, which is also of a conventional structure. The linkage positioning unit 4A is pivotally connected to the housing unit 3A in a matching shape. The housing unit 3A further comprises a bracket 32. The bracket 32 is located at the top of the shell of the housing unit 3, adjacent to the passage hole 31. Positioning teeth 321 are formed on the vertical side of the bracket 32. The linkage positioning unit 4A comprises a contact tooth portion 44 and a positioning portion 45. The traction element 12A comprises a tooth rack 122 and is formed on a vertical wall surface. The contact tooth portion 44 used teeth distributed in an arc layout to engage with the tooth rack 122. The positioning portion 45 comprises a structure inside suitable for interlocking with the positioning teeth 321 on the side of the bracket 32 for positioning. The positioning portion 45 is for locking or releasing function. For example, when the positioning portion 45 pushes a release button 451 in the direction of the arrow A shown in FIG. 7, the locked state can be released. The linkage positioning unit 4A is linked in such a manner that when the positioning portion 45 is pressed down, the contact tooth portion 51 is engaged with the tooth rack 122 to drive the traction element 12A to rise. The positioning portion 45 is responsible for locking to the position by the positioning tooth 321. When the release button 521 is pushed, the lcoked state is released. The remaining is similar to the conventional use, and will not be described in detail. Therefore, the present invention does not limit the structure of the linkage positioning unit as long as the design can lift/lower and position the traction element 1 when in use.

In summary, the present invention is characterized in using the plurality of elastic pressing elements 21 of the pressure deformable unit 2 pressing against the suction cup 11. As such, when the suction cup is attached to a curved surface, the pressure deformable unit 2 is pressed by an external force so that the plurality of elastic pressing elements 21 are deformed to different extents and are pressed against on the suction cup 11, to ensure that the bottom surface of the suction cup is completely attached to the curved surface.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A suction holder, comprising:
   a suction unit comprising a suction cup and a traction element engaging a central portion of a top surface of the suction cup, the central portion of the top surface of the suction cup being raised and being bordered by a peripheral portion of the top surface of the suction cup;
   a housing unit comprising an upwardly raised central portion and disposed with a passage hole for the traction element to pass therethrough;
   a pressure deformable unit located on the suction cup and confined in the housing unit, the pressure deformable unit having a circumference radially distributed with a plurality of elastic pressing elements, a top of the pressure deformable unit being in contact with an inner wall of the housing unit, and the plurality of elastic pressing elements pressing on the suction cup;
   a spring located between the pressure deformable unit and the suction cup, the spring surrounding a periphery of the traction element and having a first portion that surrounds the central portion of the top surface of the suction cup and a second portion that contacts the peripheral portion of the top surface of the suction cup; and
   a linkage positioning unit located on the housing unit and comprising projections inserted into guiding slots of the traction element of the suction unit, the linkage positioning unit operable to drive the traction element to move upward and be locked in a raised position by pulling the linkage positioning unit downward to pivot the linkage positioning unit about the projections until a free distal end portion of the linkage positioning unit contacts an outer surface of the housing unit, and the linkage positioning unit operable to release the traction element from the raised position by pulling the linkage positioning unit upward to pivot the linkage positioning unit about the projections to separate the free distal end portion of the linkage positioning unit from the outer surface of the housing unit;
   wherein the linkage positioning unit has an outer contour such that, when the free distal end portion of the linkage positioning unit is in contact with the outer surface of the housing unit, the outer contour of the linkage positioning unit conforms to an outer contour of the housing unit.

2. The suction holder as claimed in claim 1, wherein the top of the pressure deformable unit is fixed to the inner wall of the housing unit.

3. The suction holder as claimed in claim 1, wherein the top of the pressure deformable unit is only in contact with the inner wall of the housing unit but is not fixed to the inner wall of the housing unit.

4. The suction holder as claimed in claim 1, wherein the top of the pressure deformable unit has a mounting hole for the traction element to extend therethrough.

5. The suction holder as claimed in claim 1, wherein each of the plurality of elastic pressing elements comprises a curved end segment, and the curved end segment of each of the plurality of elastic pressing elements comprises a curved surface pressed against the top surface of the suction cup.

6. The suction holder as claimed in claim 1, wherein the suction unit further comprises a protruding ring that protrudes upward and is formed on a circumferential edge of the suction cup.

* * * * *